(12) United States Patent
Madnani et al.

(10) Patent No.: US 8,432,976 B2
(45) Date of Patent: Apr. 30, 2013

(54) SYSTEM AND METHOD FOR DETECTING FIELD ORDER OF VIDEO SEQUENCES

(75) Inventors: Shekhar Madnani, Uttar Pradesh (IN); Raman Kumar Sonkhla, Punjab (IN)

(73) Assignee: Interra Systems Inc., Cupertino, CA (US)

( * ) Notice: Subject to any disclaimer, the term of this patent is extended or adjusted under 35 U.S.C. 154(b) by 367 days.

(21) Appl. No.: 12/930,640

(22) Filed: Jan. 12, 2011

(65) Prior Publication Data
US 2012/0176538 A1    Jul. 12, 2012

(51) Int. Cl.
*H04N 7/12* (2006.01)
(52) U.S. Cl.
USPC .................................................... 375/240.26

(58) Field of Classification Search ............. 375/240.01, 375/240.26; 348/97, 441, 459, 701; *H04N 7/12*
See application file for complete search history.

(56) References Cited

U.S. PATENT DOCUMENTS 7,916,784 B2 *    3/2011    MacInnis et al. ............. 348/701

* cited by examiner

*Primary Examiner* — Young Lee
(74) *Attorney, Agent, or Firm* — Benjamin A. Balser; Balser & Grell IP Law

(57) ABSTRACT

The invention provides a method, system and computer program product for detecting field order of a video sequence. The method includes processing a top and bottom field picture of a first frame and a second frame, in which the first and second frames are consecutive frames of a video sequence. Difference frames are obtained by calculating the difference of the top and bottom field pictures of the first and second frames. Thereafter, field order is detected using the difference frames.

14 Claims, 14 Drawing Sheets

SYSTEM AND METHOD FOR DETECTING FIELD ORDER OF VIDEO SEQUENCES

FIELD OF INVENTION

The present invention relates to interlaced video data. More specifically, it relates to a method and system for detecting field order of interlaced frames of a video sequence.

BACKGROUND

The technique of interlacing was developed for cathode ray tube (CRT) display screens. This technique involves dividing one frame into two sets of fields, viz. a top field and a bottom field. Each field includes half of the lines (or row of pixels) required to generate the picture. For example, a first field (a top field) may include the odd pixel rows of the image and a second field (a bottom field) may include the even pixel rows of the image. During each refresh cycle of an interlaced screen, half of the pixel rows are refreshed (either odd rows or even rows), thereby decreasing the amount of data that is processed prior to displaying. As a result, the bandwidth requirements of interlaced display screens are reduced by half as compared to the display screens that refresh each pixel row during each refresh cycle (progressive scan display screens). Additionally, since the number of pixels to be processed is reduced by half, an interlaced display screen can provide twice the refresh rates as compared to the progressive scan display screens, thereby providing better picture quality. Thus, this technique improves picture quality without incurring a bandwidth overhead and reduces cost of display equipments by reducing the bandwidth requirements.

Further, an interlaced display screen may function in a manner in which the top field is refreshed first and thereafter the bottom field is refreshed or vice versa. Since, the two fields are shot at different instances of time, the chronological ordering of the fields (or field order) while being refreshed is important for a smooth rendering of the video. In traditional analog interlaced video, the information related to the field order is included in the encoded video stream. However, due to the convergence in the analog and digital technologies an interlaced analog video may undergo processes such as digital sampling, editing, and so forth before being displayed. As a result of these processes, the field order information is prone to being lost. In the absence of the field order information, the fields may be displayed in an incorrect chronological order. This leads to video jerkiness and hence higher bit rate would be required by the encoder to compress this video sequence. Video jerkiness affects the quality of the video signal received at the user end. Thus, there is a need to correctly detect the field order of a video sequence so that the video may be rendered in the correct chronological order.

SUMMARY

The present invention provides a method, system and computer program for field order detection of a video sequence. The method includes processing a top and bottom field picture of a first frame and a second frame, in which the first and second frames are consecutive frames of a video sequence. A difference frame is obtained by calculating the difference of the top field picture of the first frame and the bottom field picture of the first frame. Further, a difference frame is obtained by calculating the difference of the bottom field picture of the first frame and the top field picture of the second frame. Thereafter, the first and second difference frames are analyzed to determine polarities of pixels present in the first and second difference frames. Subsequently, a field order signal indicating the field order of the video sequence is generated based on the number of one or more opposite polarity pixels and the number of one or more identical polarity pixels in the first and second difference frames.

Various embodiments of the present invention provide several advantages. The field order may be calculated corresponding to the video sequence accurately and prior to being displayed by the display device. This leads to a smooth rendering of the video sequence in accordance with the order in which the video was captured. Further, the present invention enables the smooth display of video from which field order information has been lost. A module implementing the method suggested by the present invention may be incorporated into the display system and used to obtain the field order information. Subsequently, the video may be displayed in accordance with the field order information.

BRIEF DESCRIPTION OF THE DRAWINGS

The various embodiments of the invention will hereinafter be described in conjunction with the appended drawings, provided to illustrate and not to limit the scope of the invention, wherein like designations denote like elements, and in which.

DETAILED DESCRIPTION OF THE INVENTION

The invention provides a system and method for detecting field order of a video sequence. Top and bottom field pictures belonging to one or more consecutive frames are analyzed. The analysis results are used to generate a field order signal.

Figure 1A:
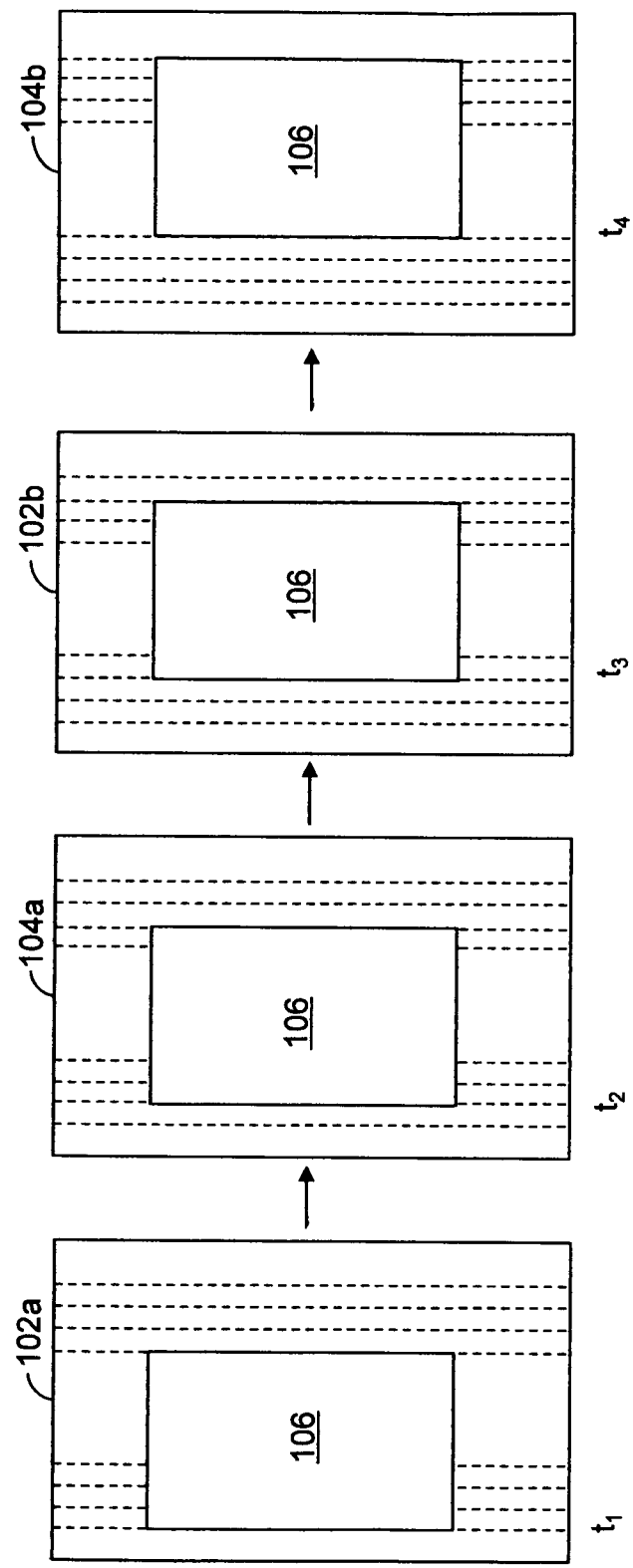
FIGS. 1A and 1B are schematic diagrams illustrating capturing of top and bottom field pictures, in accordance with an embodiment of the present invention.
Figure 1B:
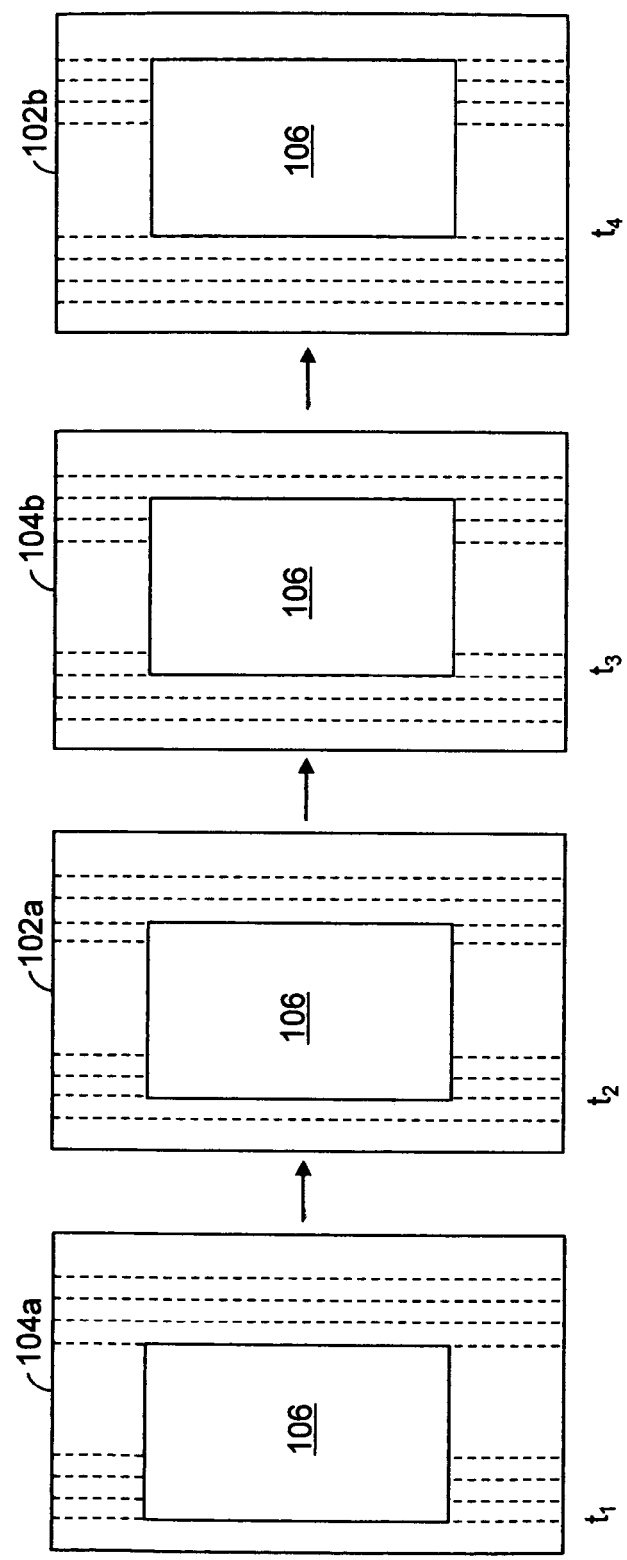

FIGS. 1A and 1B are schematic diagrams of top and bottom field pictures, in accordance with an embodiment of the present invention. FIGS. 1A and 1B include top field pictures 102a and 102b, bottom field pictures 104a and 104b, and an object 106.

Referring now to FIG. 1A, top field picture 102a and bottom field picture 104a belong to a first frame and top field picture 102b and bottom field picture 104b belong to a second frame where the first and the second frames are consecutive frames of a video sequence. In an embodiment of the present invention, the video sequence is encoded using a known in the art encoding viz. Moving Picture Expert Group (MPEG), Windows Media Video (WMV), Quicktime, and so forth. Top field pictures 102a and 102b, and bottom field pictures 104a and 104b are captured by an interlaced camera in the top field first (TFF) mode. It should be realized by persons skilled in the art that capturing a video in a TFF mode entails capturing a top field picture of a frame followed by capturing the bottom field picture of the frame. Therefore, top field picture 102a is captured at time instant $t_1$, bottom field picture 104a is captured at time instant $t_2$, top field picture 102b is captured at time instant $t_3$, and bottom field picture 104b is captured at time instant $t_4$. Further, top field pictures 102a, 102b and bottom field pictures 104a, 104b show different positions of object 106 at different time instants in the video sequence.

Referring now to FIG. 1B, top field pictures 102a and 102b and bottom field pictures 104a and 104b captured by an interlaced camera in a bottom field first (BFF) mode are depicted. In a scenario when the field pictures are captured in the BFF mode, bottom field picture 104a is captured first, followed by top field picture 102a, which in turn is followed by the capture of bottom field picture 104b, and so forth.

Figure 2A:
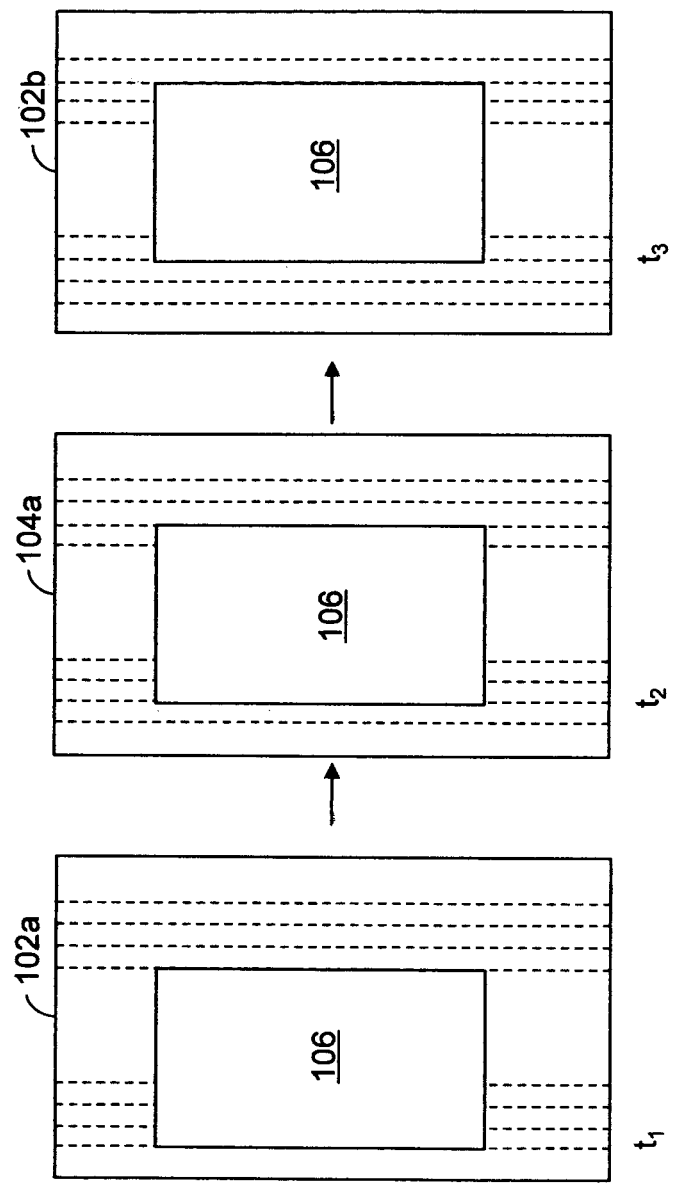
FIGS. 2A and 2B are schematic diagrams illustrating three field pictures, in accordance with an embodiment of the present invention.
Figure 2B:
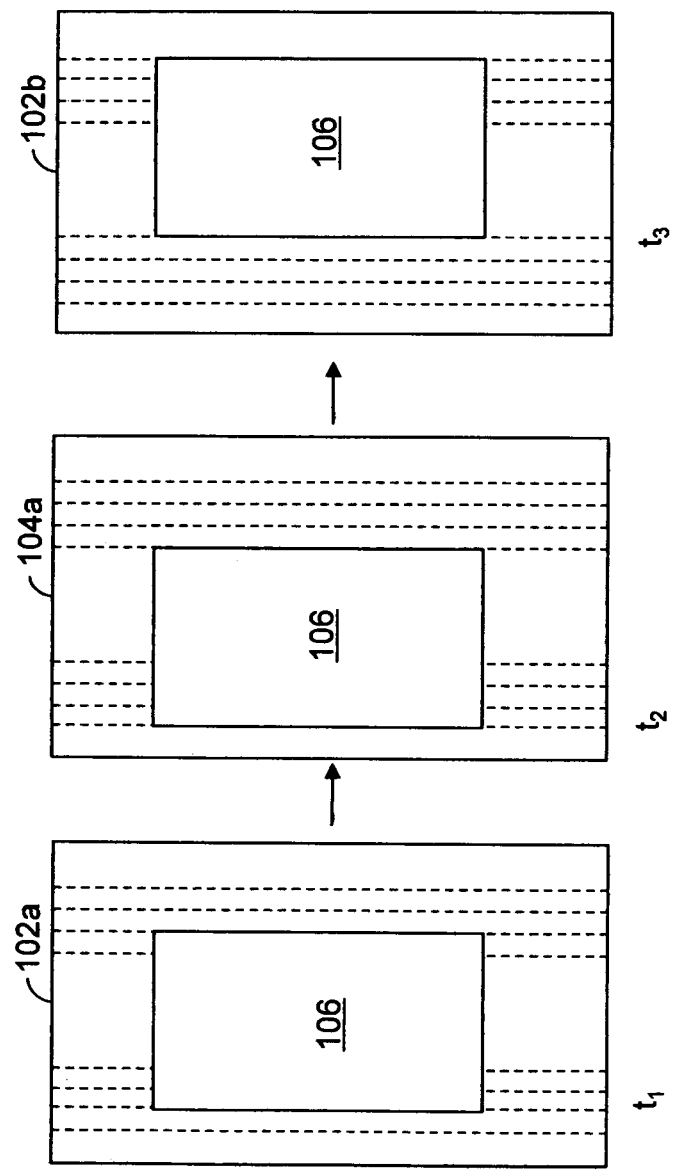

FIGS. 2A and 2B are schematic block diagrams illustrating a set of three field pictures of a received video sequence. The sequence of field pictures given in FIGS. 2A and 2B is used by the present invention to detect the field order in accordance with the present invention. On receiving a video sequence, it is not known if the received video was captured in the TFF or the BFF mode. It is assumed that the received video sequence was captured in the TFF mode and then field order detection process is carried out to evaluate if the assumption is correct or not. Therefore, the sequence of field pictures shown in FIGS. 2A and 2B represent the sequence as used in the TFF mode. A person ordinarily skilled in the art will appreciate that the present invention can be implemented to assume that the received video was captured in the BFF mode and can accordingly use the corresponding sequence as per the BFF mode. FIGS. 2A and 2B include top field pictures 102a and 102b, and bottom field picture 104a. In an embodiment of the present invention, the set of three field pictures illustrated in the FIGS. 2A and 2B are consecutive field pictures corresponding to two consecutive frames captured in TFF and BFF modes as explained in conjunction with FIGS. 1A and 1B, respectively. The set of three field pictures are used to perform field order detection as described below in conjunction with various figures. The ensuing description explains the method for detecting field order using the two scenarios (TFF mode capture and BFF mode capture) to depict the functioning of the present method in both the scenarios. It should be realized by persons skilled the art that in practice the below described method will be executed only for a video sequence captured in either of the two video capture modes, TFF and BFF.

Figure 3A:
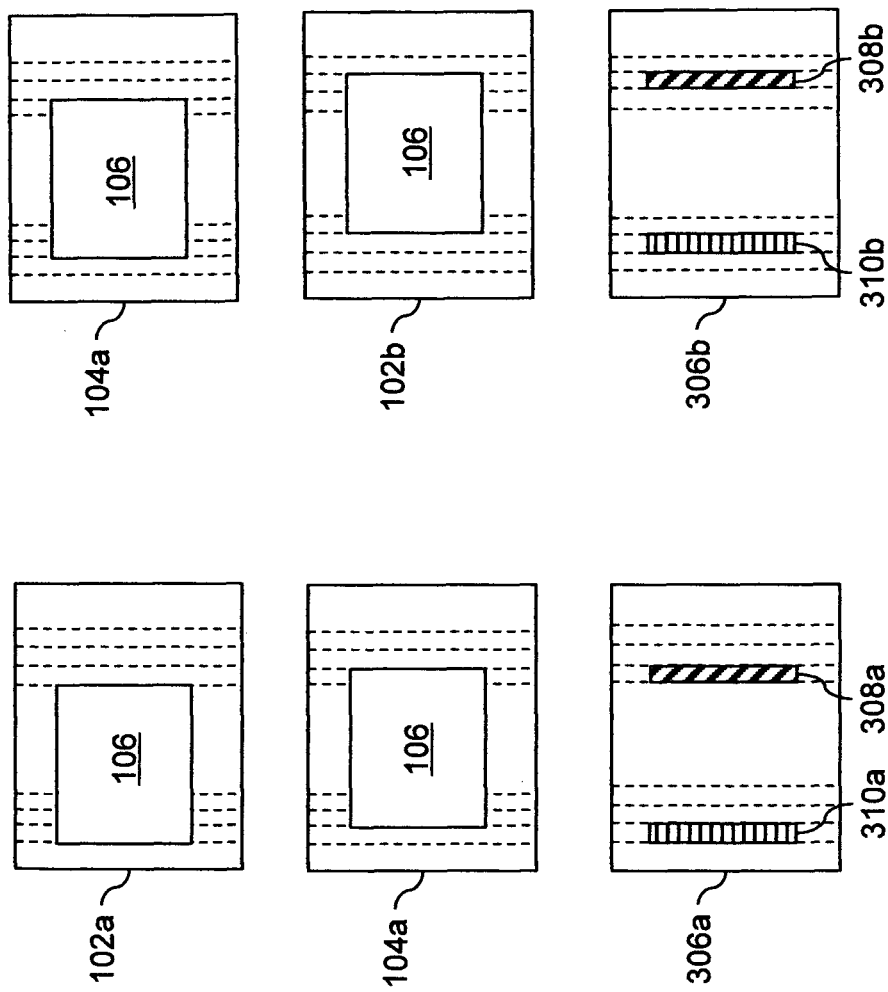
FIGS. 3A, 3B, 3C, and 3D are schematic diagrams illustrating difference frames, in accordance with an embodiment of the present invention.
Figure 3B:
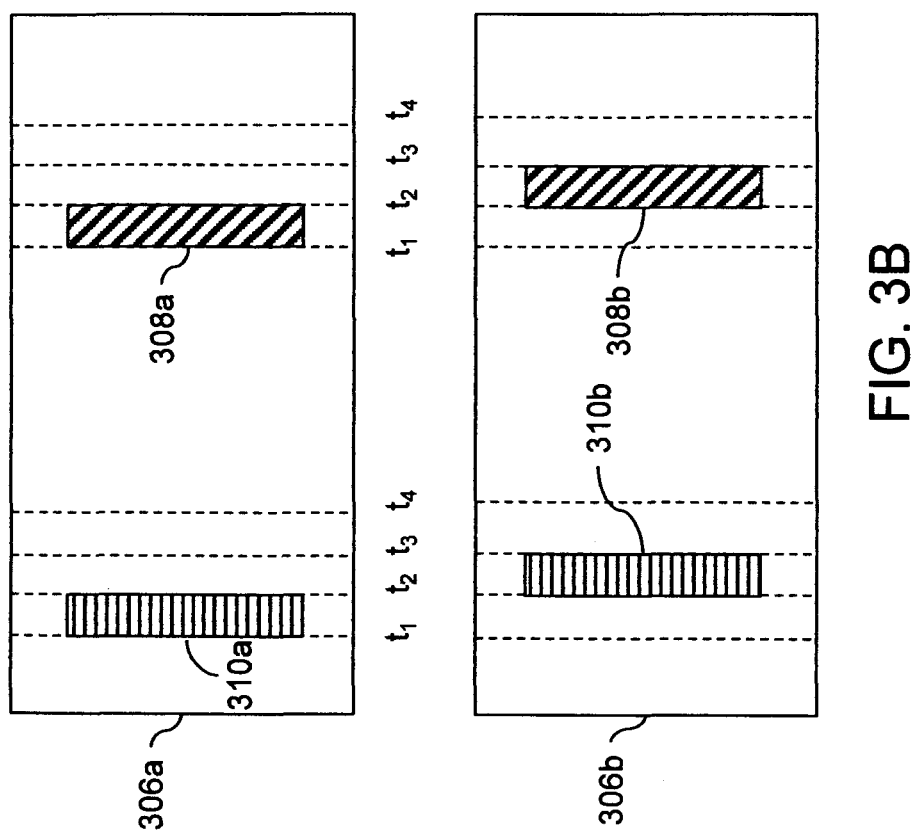

FIGS. 3A, 3B, 3C, and 3D are schematic diagrams illustrating calculation of difference frames, in accordance with an embodiment of the present invention. FIG. 3A includes difference frames 306a and 306b calculated corresponding to field pictures illustrated in FIG. 2A, i.e. top field pictures 102a and 102b, and bottom field picture 104a. Difference frames 306a and 306b include positive polarity pixel regions 308a and 308b, respectively, as explained in further detail below with reference to FIG. 3A and FIG. 5. Further, difference frames 306a and 306b include negative polarity pixel regions 310a and 310b, respectively. FIG. 3A further includes top field pictures 102a and 102b, and bottom field picture 104a shown to be a part of FIGS. 1A and 2A. FIG. 3B illustrates comparison between difference frames 306a and 306b. FIG. 3B includes the elements that are shown to be a part of FIG. 3A.

Figure 3C:
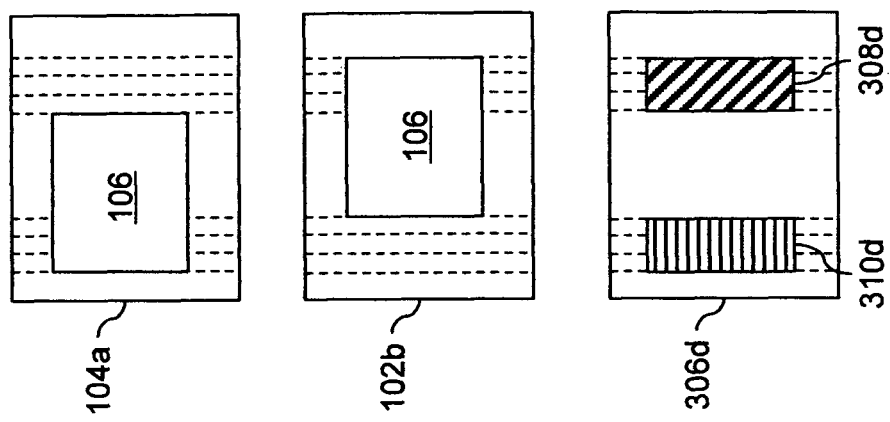
Figure 3C:
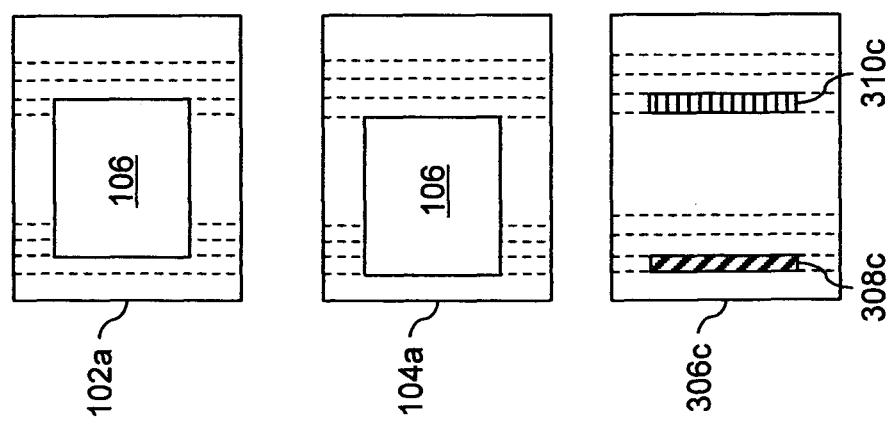
Figure 3D:
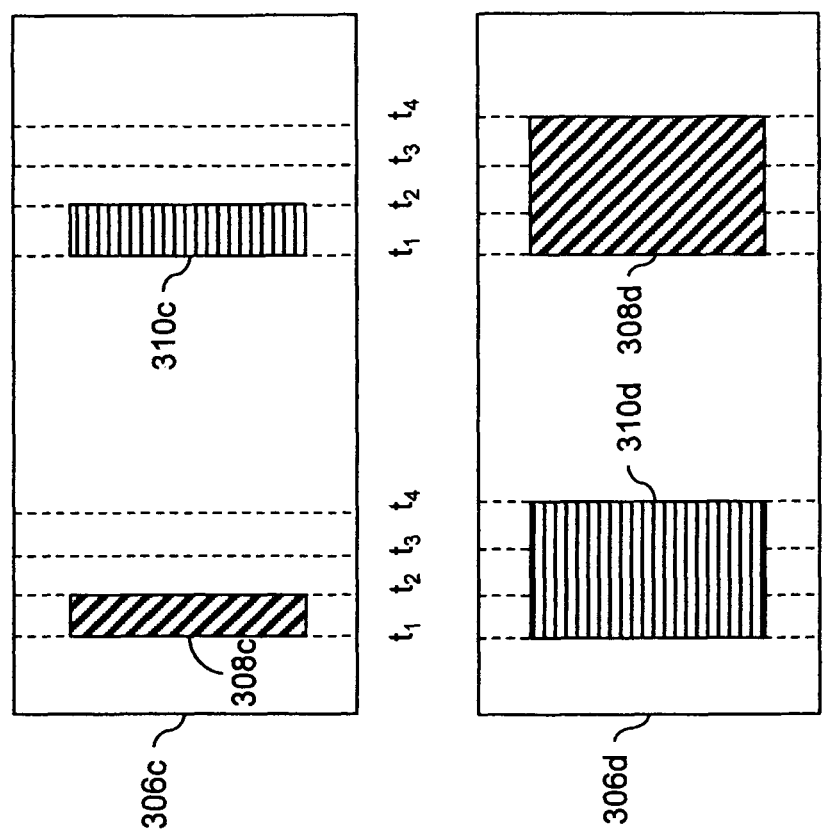

Further, FIG. 3C includes difference frames 306c and 306d calculated corresponding to field pictures illustrated in FIG. 2B, i.e. top field pictures 102a and 102b, and bottom field picture 104a. Difference frames 306c and 306d include positive polarity pixel regions 308c and 308d, respectively. Further, difference frames 306c and 306d include negative polarity pixel regions 310c and 310d, respectively. FIG. 3C further includes top field pictures 102a and 102b, and bottom field picture 104a shown to be a part of FIGS. 1B and 2B. FIG. 3D illustrates comparison between difference frames 306c and 306d. FIG. 3D includes the elements that are shown to be a part of FIG. 3C.

Referring now to FIG. 3A, difference frame 306a is calculated using top field picture 102a and bottom field picture 104a. In an embodiment of the present invention, difference frame 306a calculation entails calculating a difference between the contrast values of corresponding pixels of top field picture 102a and bottom field picture 104a. Thereafter, based on the difference in contrast values, positive polarity pixel region 308a, negative polarity pixel region 310a, and a no polarity pixel region (difference frame region apart from positive and negative polarity pixel regions) are determined. The method followed for determining positive and negative polarity regions is explained in detail in conjunction with FIG. 5. Further, similar to the manner of calculation of difference frame 306a, difference frame 306b is calculated.

Referring now to FIG. 3B, difference frames 306a and 306b are shown such that there is no overlapping region with the same polarity pixels between the two difference frames. The overlapping regions are the areas of difference frames 306a and 306b in identical time instants that have either a positive polarity pixel region or a negative polarity pixel region in both the difference frames 306a and 306b. For example, difference frame 306a has positive polarity pixel region 308a in the time slot $t_1$ to $t_2$, and difference frame 306b has a no polarity pixel region in the time slot $t_1$ to $t_2$. Thus, the difference frames 306a and 306b do not have an overlapping region in the time slot $t_1$ to $t_2$.

Referring now to FIG. 3C, difference frame 306c is calculated using top field picture 102a and bottom field picture 104a and difference frame 306d is calculated using bottom field picture 104a and top field picture 102b. In an embodiment of the present invention, difference frame 306d calculation entails calculating difference frame 306d in a manner similar to the calculation of difference frames 306a and 306b explained in conjunction with FIG. 3A.

Referring now to FIG. 3D, difference frames 306c and 306d are shown, illustrating overlapping regions between the two difference frames. The overlapping regions are the areas of difference frames 306c and 306d in identical time instants that have either a positive polarity pixel region or a negative polarity pixel region in both the difference frames 306c and 306d. For example, difference frame 306c has positive polarity pixel region 308c in the time slot $t_1$ to $t_2$. Further, difference frame 306d has a portion of negative polarity pixel region 310d in the time slot $t_1$ to $t_2$. Thus, the difference frames 306c and 306d have an overlapping region in the time slot $t_1$ to $t_2$.

Figure 4:
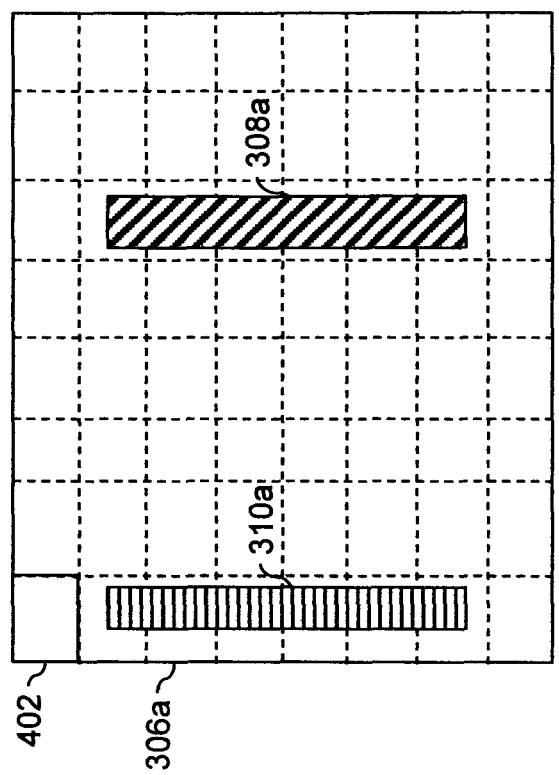
FIG. 4 is a schematic diagram illustrating a difference frame in detail, in accordance with an embodiment of the present invention.

FIG. 4 is a schematic diagram illustrating difference frame 306a in detail, in accordance with an embodiment of the present invention. In addition to elements shown to be present in FIGS. 3A and 3B, difference frame 306a includes one or more pixel blocks, such as a pixel block 402.

Difference frame 306a is divided into N×N pixel blocks, such as pixel block 402, in which N is a positive integer. For example, N may be configured to have a value 8. Each pixel block, such as pixel block 402, includes either positive polarity pixels, negative polarity pixels, or no polarity pixels. Thus, the pixel blocks either belong to a positive polarity pixel region, such as positive polarity pixel region 308a, a negative polarity pixel region such as negative polarity pixel region 310a, or a no polarity pixel region. The number of pixel blocks belonging to positive polarity pixel regions and negative polarity pixel regions are individually counted. Thereafter, the respective counts are used to determine block level motion, inter-field motion, and to generate field order signals. The methods followed for determining block level motion, the inter-field motion, and for generating field order signals are explained in detail in conjunction with FIGS. 5, 6A, and 6B.

Figure 5:
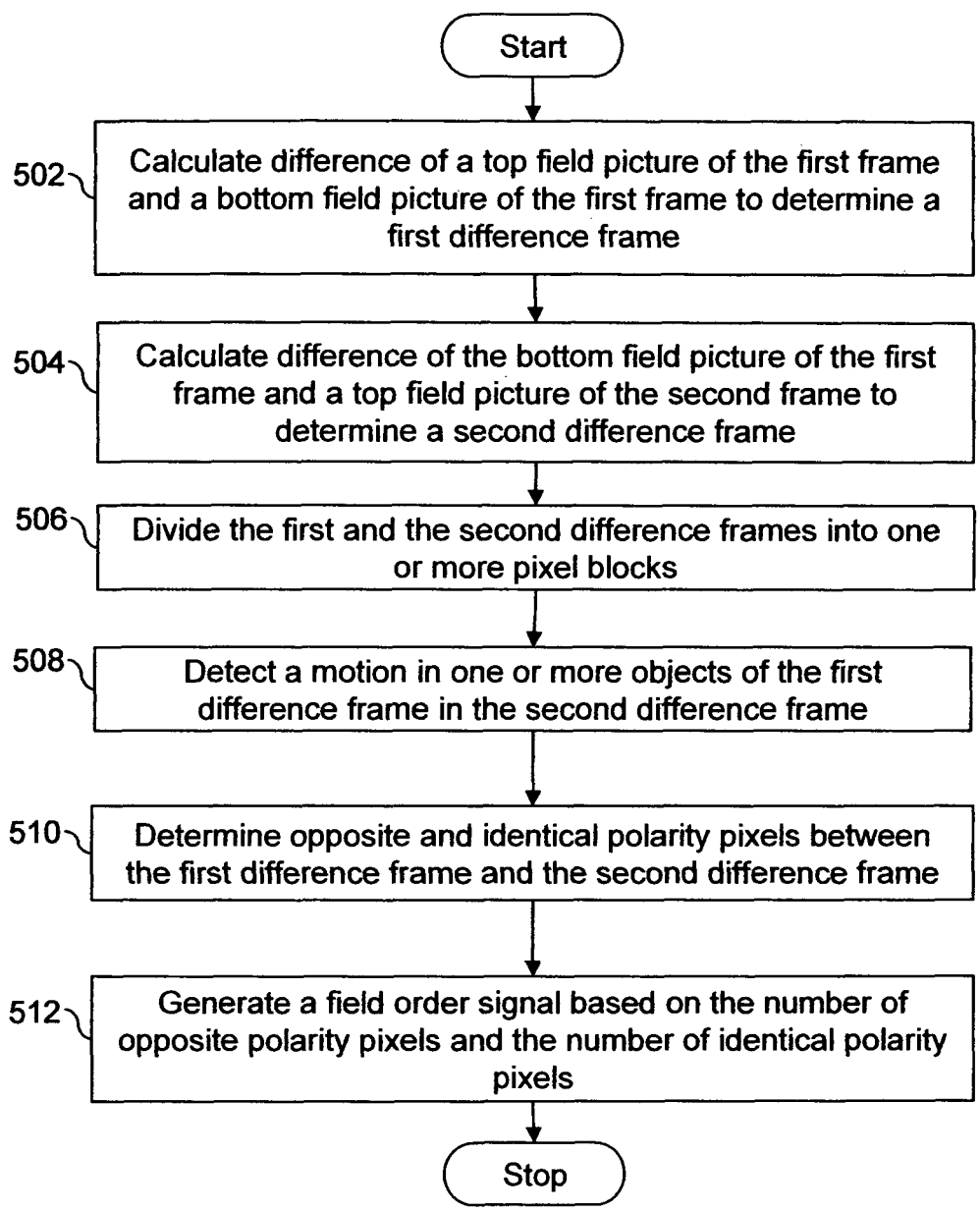
FIG. 5 is a flowchart illustrating a method for field order signal generation, in accordance with an embodiment of the present invention.

FIG. 5 is a flowchart illustrating a computer implemented method for detecting field order of a video sequence, in accordance with an embodiment of the present invention. FIG. 5 is explained in detail below in conjunction with FIGS. 1, 2, 3A, 3B, 3C, 3D and 4.

At step 502, difference frame 306a is calculated using top field picture 102a and bottom field picture 104a, where top field picture 102a and bottom field picture 104a belong to the same frame, and where the frame belongs to a scene that is a portion of a video sequence. In an embodiment of the present invention, the frames belong to a video sequence which may be encoded using a known in the art encoding viz. Moving Picture Expert Group (MPEG), Windows Media Video (WMV), Quicktime, and so forth. Further, top field picture 102a and bottom field picture 104a include an image of one or more objects such as object 106. As described previously, top field picture 102a and bottom field picture 104a have been captured in a TFF mode in which top field picture 102a was captured at time instant $t_1$ and bottom field picture 104a was captured at time instant $t_2$.

Further, calculating difference frame 306a entails determining positive polarity pixel region 308a and negative polarity pixel region 310a. Classification of the pixel regions as positive polarity pixel region and negative polarity pixel region is accomplished based on a difference in the contrast of the corresponding pixels of the relevant field pictures. For example, when difference frame 306a is calculated, contrast difference is calculated for each corresponding pixel pair of top field picture 102a and bottom field picture 104a. Thereafter, each pixel contrast difference is compared with positive and negative values of a predetermined contrast threshold. Pixels corresponding to pixel contrast differences above the positive threshold contrast are marked as a part of positive polarity pixel region 308a and the pixels corresponding to pixel contrast differences below the negative contrast threshold are marked as a part of negative polarity pixel region 310b. Further, pixels corresponding to pixel contrast differences lying in the positive and negative values of the threshold contrast are marked as a part of no polarity pixel region (not shown). In an embodiment of the present invention, the value of the predetermined contrast threshold is 20. At step 504, difference frame 306b is calculated using bottom field picture 104a and top field picture 102b, where bottom field picture 104a and top field picture 102b belong to consecutive frames. Difference frame 306b is calculated in a manner similar to the calculation of difference frame 306a. Steps 502 and 504 have been described assuming that the field pictures shown in FIG. 2A are received. In case the field pictures shown in FIG. 2B are received, the difference frames are still calculated in the same manner, however by using the field pictures shown in FIG. 2B. In this case, difference frames 306c and 306d are calculated at steps 502 and 504 respectively. Here, difference frames 306c and 306d are calculated corresponding to top and bottom field pictures 102a and 104a, and bottom and top field pictures 104a and 102b, respectively.

In an embodiment of the present invention, the difference frames 306a and 306b, or 306c, and 306d, as the case be, are calculated (corresponding to top and bottom field pictures) when a frame level motion is detectable in the frames to which the top and bottom field pictures belong. To determine frame level motion, the contrast difference of the corresponding pixels is compared with the contrast threshold. If a predetermined number of pixels have contrast differences that are either below the negative contrast threshold or above the positive contrast threshold, frame level motion exists and the processing continues to subsequent steps.

In an embodiment of the present invention, difference frames 306a and 306b, or 306c and 306d, as the case be, are processed for morphological operations. The morphological operations are performed to eliminate the noise and speckles present in positive polarity pixel regions 308a and 308b, or 308c and 308d, as the case may be, and the negative polarity pixel regions 310a and 310b, or 310c and 310d, as the case may be. It should be realized by persons skilled in the art that morphological operations are performed using one of the known in the art techniques and therefore a detailed explanation has been excluded from the present description for the sake of brevity.

At step 506, difference frames 306a and 306b, or 306c and 306d, as the case may be, are divided into NXN pixel blocks such as pixel block 402, in which N is a positive integer. In an embodiment of the present invention, N is configured to have a value 8. Pixels belonging to difference frames 306a and 306b, or 306c and 306d, as the case may be, are classified under positive, negative and no polarity, thereby dividing the frame into positive pixel regions, negative pixel regions and no polarity pixel regions. Each of the pixel blocks such as pixel block 402 belongs to either a positive polarity pixel region, a negative polarity pixel region, both the negative and positive polarity pixel regions, or the no polarity pixel regions.

At step 508, motion is detected for object 106 using difference frames 306a and 306b, if difference frames 306a and 306b are calculated in steps 502 and 504. Similarly, motion is detected for object 106 using difference frames 306c and 306d, if difference frames 306c and 306d are calculated in steps 502 and 504.

Motion detection is performed at block-level and inter-field level. Block-level motion detection involves detecting the motion by calculating the sum of the number of positive or negative pixels in each pixel block such as pixel block 402 of each difference frame. A ratio of the sum obtained above and total number of pixels in the pixel block is compared with a predetermined threshold pixel percent. If the ratio is greater than the threshold pixel percent, then block level motion is present. In an embodiment of the present invention, the threshold pixel percent has a value in the range of 10 to 40. The above described process is repeated for each pixel block to determine the number of blocks that have motion.

Further, inter-field level motion detection is performed. The inter-field level motion detection entails using the number of pixel blocks that have been determined to have motion. A ratio of the number of pixel blocks having motion and total number of pixel blocks in the corresponding difference frame is calculated. If the ratio is greater than a predetermined motion block threshold percent, then inter-field motion is present. In an embodiment of the present invention, the predetermined motion block threshold percent has a value in the range 0.10-2.0%.

At step 510, opposite and identical polarity pixels in the overlapping regions between difference frames 306a and 306b are determined. Similarly, if difference frames 306c and 306d are calculated at steps 502 and 504, opposite and identical polarity pixels in the overlapping regions between difference frames 306c and 306d are determined.

The overlapping regions are the areas of difference frames in identical time instants that have either a positive polarity pixel region or a negative polarity pixel region in both difference frames. For example, difference frame 306c has positive polarity pixel region 308c in the time slot $t_1$ to $t_2$. Further, difference frame 306d has a portion of negative polarity pixel region 310d in the time slot $t_1$ to $t_2$. Thus, difference frames 306c and 306d have an overlapping region in the time slot $t_1$ to $t_2$. Similarly, difference frame 306a has positive polarity pixel region 308a in the time slot $t_1$ to $t_2$, and difference frame 306b has a no polarity pixel region in the time slot $t_1$ to $t_2$. Thus, the difference frames 306a and 306b do not have an overlapping region in the time slot $t_1$ to $t_2$. Further, the number of opposite polarity pixels is the number of pixels that have opposite polarity in the overlapping regions. In the above example, since the overlapping regions of difference frames 306c and 306d have overlapping portions of positive and negative polarity pixel regions, the pixels contained in the overlapping regions are opposite polarity pixels. Further, in a scenario when the overlapping region includes portions of identical (either positive or negative) polarity pixel regions, the pixels in the overlapping regions are identical polarity pixels. In an embodiment of the present invention, the number of identical and opposite polarity pixels is determined by determining the number of identical and opposite polarity pixel blocks in the overlapping regions.

At step 512, a field order signal is generated based on the number of the opposite polarity pixels and the number of the identical polarity pixels. The generation of the field order signal is explained in detail in conjunction with FIG. 6.

Figure 6A:
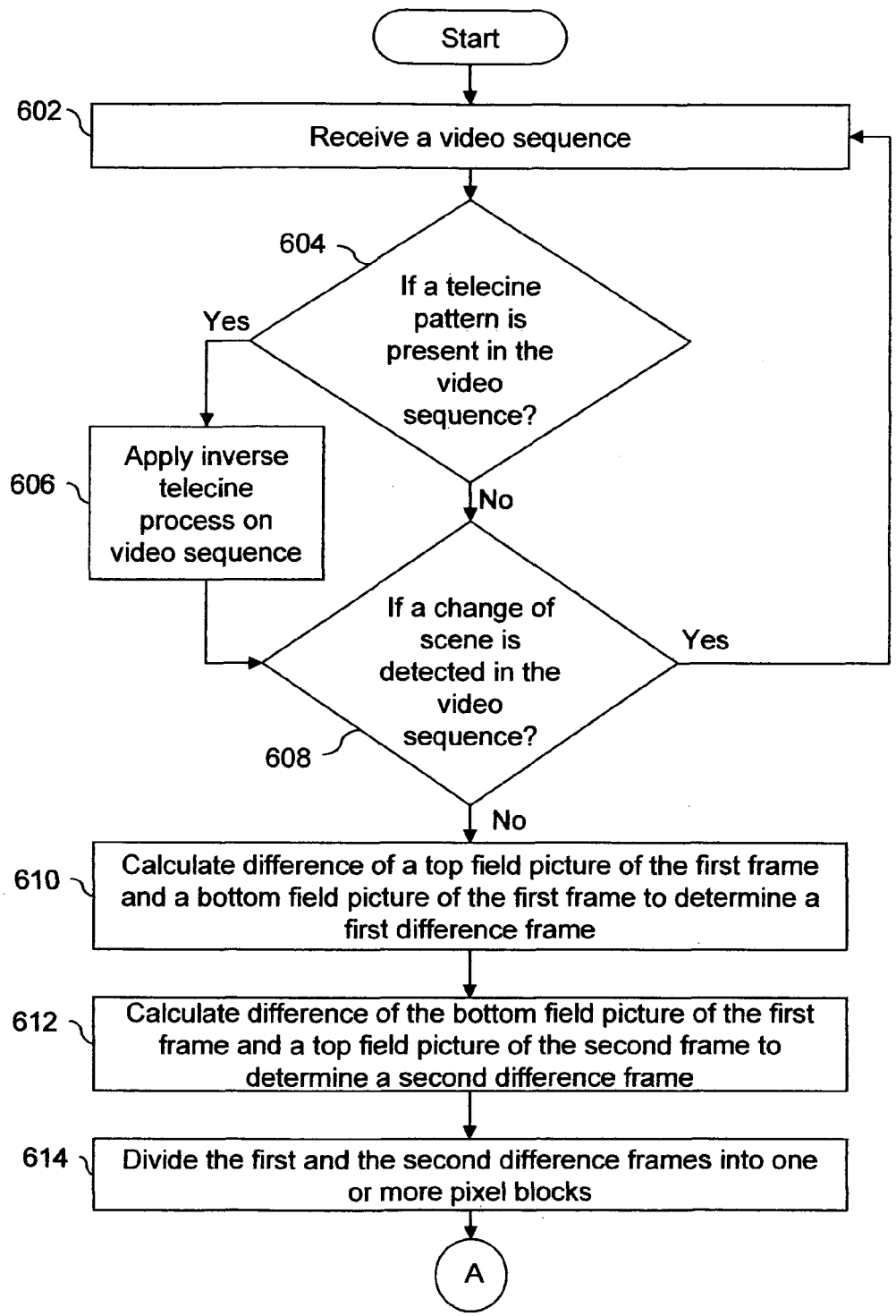
FIGS. 6A, 6B, and 6C is a flowchart illustrating a method for field order signal generation in detail, in accordance with an embodiment of the present invention.
Figure 6B:
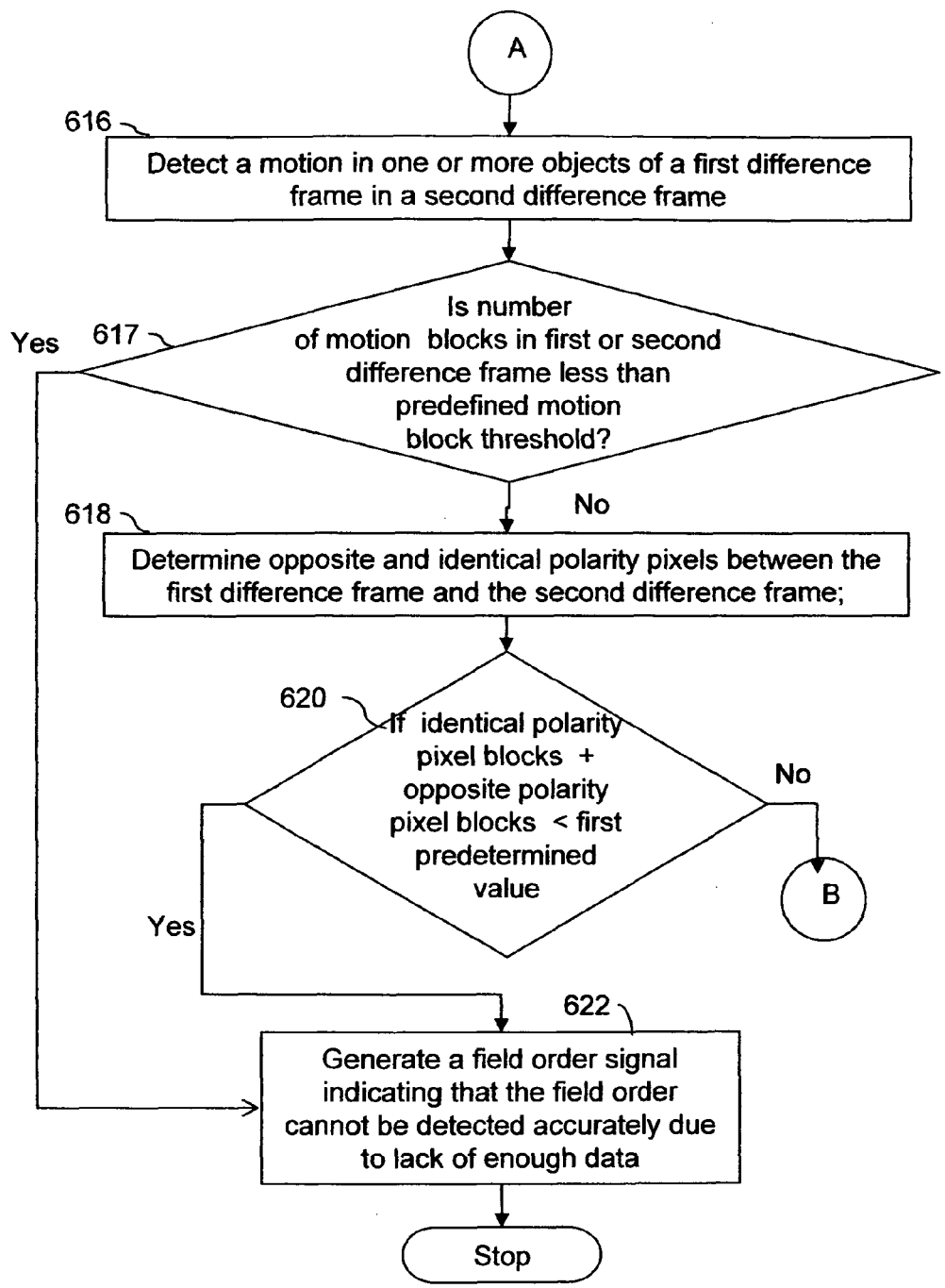
Figure 6C:
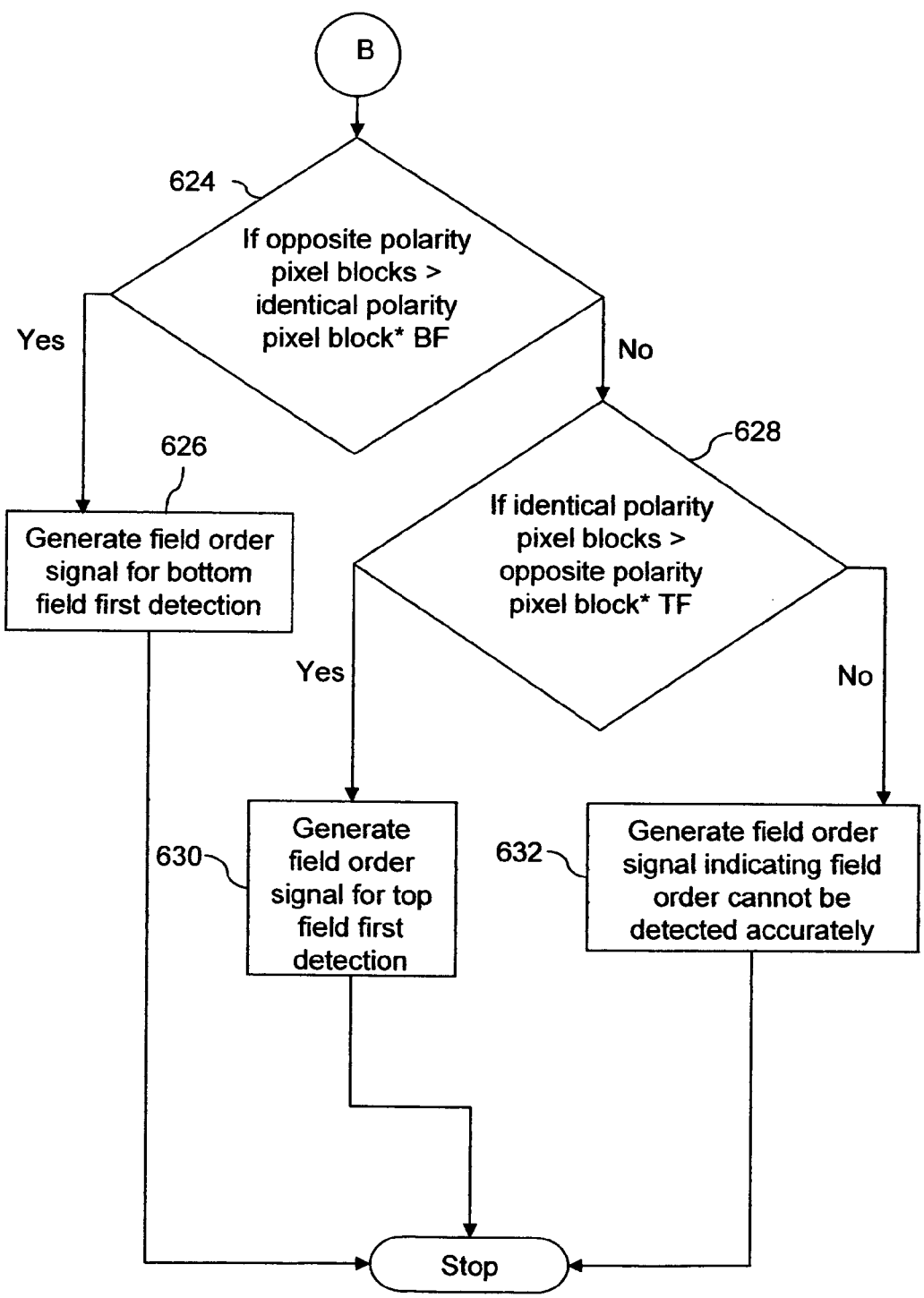

FIGS. 6A, 6B, and 6C is a flowchart illustrating a method for generating a field order signal in detail, in accordance with an embodiment of the present invention. FIG. 6 is explained below in conjunction with FIGS. 1, 2, 3A, 3B, 4, and 5.

At step 602, a video sequence encoded using a known in the art encoding viz. Moving Picture Expert Group (MPEG), Windows Media Video (WMV), Quicktime, and so forth is received. At step 604, a check is performed to determine whether a telecine pattern exists in the received video sequence. If it is determined at step 604 that the telecine pattern exists, then step 606 is performed. At step 606, an inverse telecine process is applied on the received video stream to obtain a non-telecine video sequence. The telecine detection process is performed using one of the known in the art techniques, and therefore a detailed explanation has been excluded from the present description for the sake of brevity.

However, if it is determined at step 604 that the telecine pattern does not exist in the video sequence then step 608 is performed.

At step 608, scene change detection is performed on the video sequence. If it is determined at step 608 that a scene change exists in the video sequence, then step 602 is performed, in which a new video sequence is received. However, if it is determined at step 608 that a scene change does not exist in the video sequence then step 610 is performed. It should be realized by persons skilled in the art that scene change detection is performed using known in the art techniques and therefore a detailed explanation has been excluded from the present description for the sake of brevity.

At step 610, difference frame 306a is calculated using top field picture 102a and bottom field picture 104a, in which top field picture 102a and bottom field picture 104a belong to the same frame, where the frame belongs to a scene and the scenes are portions of the video sequence. Difference frame 306a calculation entails calculating positive and negative polarity pixel regions. The method followed for calculating difference frame 306a has been explained in detail in conjunction with step 502 of FIG. 5.

At step 612, difference frame 306b is calculated using bottom field picture 104a and top field picture 102b, where bottom field picture 104a and top field picture 102b belong to the consecutive frames of the video sequence. In case the field pictures as shown in FIG. 2B are received, difference frames 306c and 306d are calculated corresponding to top and bottom field pictures 102a and 104a, and bottom and top field pictures 104a and 102b, respectively. The method followed for the calculation of a difference frame has been explained in detail in conjunction with steps 502 and 504 of FIG. 5.

In an embodiment of the present invention, the difference frames 306a and 306b or 306c and 306d, as the case be, are calculated when a frame level motion is detectable in the frames to which the top and bottom field pictures belong. To determine frame level motion, the contrast difference of the corresponding pixels is compared with the contrast threshold. If a predetermined number of pixels have contrast differences that are either below the negative contrast threshold or above the positive contrast threshold, frame level motion exists and the processing continuing to subsequent steps.

At step 614, difference frames 306a and 306b or 306c and 306d, as the case be, are divided into N×N pixel blocks such as pixel block 402, in which N is a positive integer. In an embodiment of the present invention, N is configured to have a value 8. Since the pixels belonging to difference frames 306a and 306b, or 306c and 306d, as the case be, are classified as a portion of positive and negative polarity pixel regions or no polarity pixel regions, each of the blocks such as block 402 belong to either a positive polarity pixel region, a negative polarity pixel region, both the negative and positive polarity pixel regions, or the no polarity pixel region.

At step 616, motion is detected for object 106 using difference frames 306a and 306b. If difference frames 306c and 306d are calculated at steps 610 and 612, motion is detected for object 106 using difference frames 306c and 306d at step 616. Motion detection is performed at block level and inter-field level. The method followed for block level and inter-field level motion detection has been explained in detail in conjunction with the step 508 of FIG. 5. At 617, it is checked if the number of motion blocks in the first or second difference frame is less than the predefined motion block threshold. If the number of motion blocks is less than the predefined motion block threshold, step 622 is performed; otherwise, step 618 is performed.

At step 618, opposite and identical polarity pixels in the overlapping regions between the difference frames 306a and 306b, or 306c and 306d, as the case may be, are determined. The method followed for determining the identical and opposite polarity pixels has been explained in detail in conjunction with the step 510 of FIG. 5. Determining identical and opposite polarity pixels includes determining the number of pixel blocks having identical and opposite polarity pixels as described above in conjunction with step 510 of FIG. 5.

At step 620, a check is performed to determine whether the sum of the identical and opposite polarity pixel blocks is less than a first predetermined value. In an embodiment of the present invention, the first predetermined value is in a range from 5 to 20. If at step 620 it is determined that the sum is less than the first predetermined value, step 622 is executed. At step 622, a field order signal is generated indicating that the field order cannot be detected accurately due to lack of enough data. However, if it is determined at step 620 that the sum of the identical and opposite polarity blocks is greater than or equal to the first predetermined value then step 624 is executed. At step 624, a check is performed to determine whether the number of opposite polarity pixel blocks is greater than the product of the number of identical polarity pixel blocks and a second predetermined value (BF). In an embodiment of the present invention, the second predetermined value is in a range from 1 to 10. If it is determined at step 624 that the number of opposite polarity pixel blocks is greater than the product of the number of identical polarity pixel blocks and the second predetermined value, step 626 is executed. At step 626, a field order signal is generated indicating that the field order is BFF.

However, if it is determined at step 624 that the number of opposite polarity pixel blocks is not greater than the product of the number of identical polarity pixel blocks and the second predetermined value, step 628 is executed. At step 628, a check is performed to determine whether the number of identical polarity pixel blocks is greater than the product of opposite polarity pixel blocks and a third predetermined value (TF). In an embodiment of the present invention, the third predetermined value is in a range from 0.7 to 5. If it is determined at step 628 that the number of identical polarity pixel blocks is greater than the product of opposite polarity pixel blocks and the third predetermined value, step 630 is executed. At step 630, a field order signal is generated indicating that the field order is TFF. However, if it is determined at step 628 that the number of identical polarity pixel blocks is not greater than the product of opposite polarity pixel blocks and the third predetermined value, step 632 is executed. At step 632 the field order signal is generated indicating that accurate field order cannot be determined. Thereafter, the method for detecting field order is terminated.

Various embodiments of the present invention illustrate the functioning of the present invention in conjunction with both the video capturing scenarios, i.e. TFF mode and BFF, practically possible. However, in practice the above described analysis will be performed for a video sequence captured in either TFF mode or BFF mode, thereby resulting in calculation of difference frames that will be akin to difference frames 306a, 306b or to difference frames 306c, 306d depending on the capture mode of the video sequence.

Figure 7:
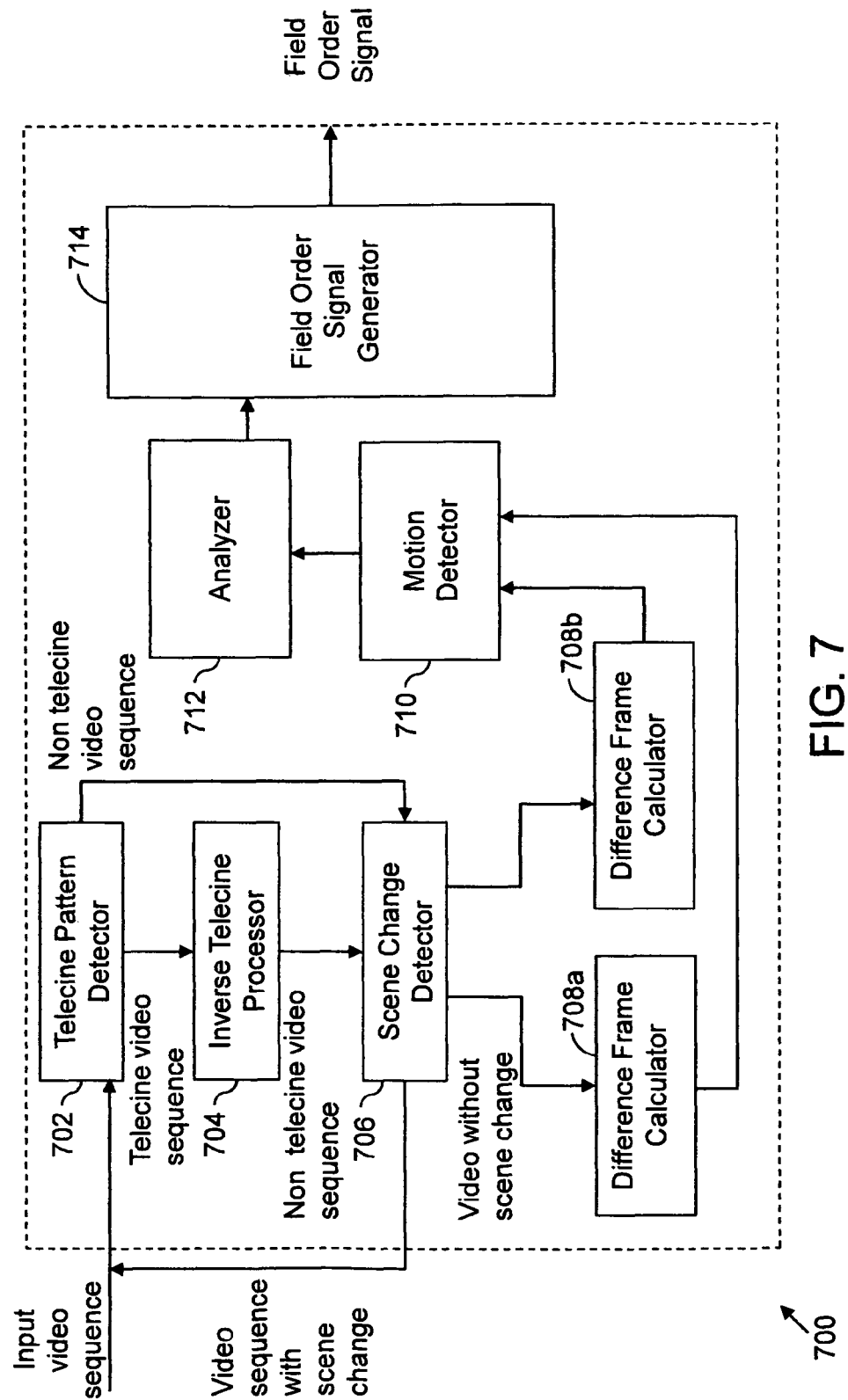
FIG. 7 is a schematic diagram illustrating a system for video sequence processing, in accordance with an embodiment of the present invention.

FIG. 7 is a schematic diagram of a system 700 for detecting field order of a video sequence, in accordance with an embodiment of the present invention. System 700 includes a telecine pattern detector 702, an inverse telecine processor 704, a scene change detector 706, difference frame calculators 708a and 708b, a motion detector 710, an analyzer 712, and a field order signal generator 714. The components shown in FIG. 7 may be software, hardware or a combination of software and hardware.

A video sequence for which a field order signal is to be generated is inputted to telecine pattern detector 702. In an example, the video sequence may be encoded using any of the known in the art encoding techniques such as Moving Picture Expert Group (MPEG), Windows Media Video (WMV), Quicktime, and so forth. Telecine pattern detector 702, detects that whether a telecine pattern exists in the received video sequence. It should be realized by persons skilled in the art that telecine detection is performed using one of the known in the art techniques and therefore a detailed explanation has been excluded from the present description for the sake of brevity. If telecine pattern detector 702 detects a telecine pattern in the video sequence, it transmits the video sequence to inverse telecine processor 704. However, if telecine pattern detector 702 does not detect a telecine pattern in the video sequence, it transmits the non-telecine video sequence to scene change detector 706.

Inverse telecine processor 704 receives telecine video sequence from telecine pattern detector 702 and processes it to eliminate the telecine pattern. It should be realized by persons skilled in the art that the inverse telecine process is performed using one of the known in the art techniques and therefore a detailed explanation has been excluded from the present description for the sake of brevity. Subsequent to eliminating the telecine pattern from the video sequence, inverse telecine processor 704 transmits the non-telecine video sequence as output to scene change detector 706.

Scene change detector 706 detects scene change in the non-telecine video sequence. If scene change detector 706 detects a scene change in the video sequence, it discards the video sequence with scene change and requests a new video sequence. However, if scene change detector 706 does not detect a scene change in the video sequence, it transmits the video sequence without scene change to difference frame calculators 708a and 708b. Difference frame calculators 708a and 708b calculate difference frames, such as difference frames 306a, 306b, 306c, and 306d. For example, if the field pictures shown in FIG. 2A are received, difference frame calculator 708a calculates difference frame 306a, and difference frame calculator 708b calculates difference frame 306b. Similarly, if field pictures shown in FIG. 2B are received, difference frame calculator 708a calculates difference frame 306c, and difference frame calculator 708b calculates difference frame 306d.

Calculation of difference frame 306a entails determining positive polarity pixel regions, such as positive polarity pixel region 308a and negative polarity pixel regions, such as negative polarity pixel region 310a. Classification of the pixel regions as positive polarity pixel region and negative polarity pixel region is accomplished based on a difference in the contrast of the corresponding pixels of the relevant field pictures. For example, when difference frame 306a is calculated, contrast difference is calculated for each corresponding pixel pair of top field picture 102a (refer FIG. 2A) and bottom field picture 104a (refer FIG. 2A). Thereafter, each pixel contrast difference is compared with positive and negative values of a predetermined contrast threshold. Pixels corresponding to pixel contrast differences above the positive threshold contrast are marked as a part of positive polarity pixel region 308a and the pixels corresponding to pixel contrast differences below the negative contrast threshold are marked as a part of negative polarity pixel region 310b. Further, pixels corresponding to pixel contrast differences lying between the positive and negative values of the threshold contrast are marked as a part of no polarity pixel region. In an embodiment of the present invention, the value of the predetermined contrast threshold is 20. Similarly, difference frames 306b, 306c, and 306d are calculated.

In an embodiment of the present invention, the difference frames 306a, 306b, 306c, and 306d are calculated (corresponding to top and bottom field pictures) by difference frame calculators 708a and 708b when a frame level motion is detectable in the frames to which the top and bottom field pictures belong. To determine frame level motion, difference frame calculators 708a and 708b compare the contrast difference of the corresponding pixels with the contrast threshold. If a predetermined number of pixels have contrast differences that are either below the negative contrast threshold or above the positive contrast threshold, frame level motion exists and the processing continues to subsequent steps.

Difference frame calculators 708a and 708b transmit the calculated difference frames 306a, 306b, 306c, and 306d to motion detector 710. Motion detector 710 detects block level and inter-field level motion using difference frames 306a, 306b, 306c, and 306d. Motion detector 710 detects the block level motion by dividing the difference frames into N×N pixel blocks such as pixel block 402 (refer FIG. 4). Block level motion detection involves calculating a sum of the number of positive or negative pixels in each block such as pixel block 402. Motion detector 710 calculates a ratio of the sum obtained above and the total number of pixels in the block, and compares the ratio with a predetermined threshold pixel percent. In an embodiment of the present invention, the predetermined threshold pixel percent is configured to be 16. If it is determined during comparison that the ratio is greater than the predetermined threshold pixel percent, then motion detector 710 establishes that block level motion is present. In an embodiment of the present invention, the threshold pixel percent (TPIX %) has a value in the range of 10 to 40. The above described process is repeated for each pixel block to determine the number of pixel blocks that have block level motion.

Further, motion detector 710 performs inter-field level motion detection. During inter-field motion detection, motion detector 710 calculates the total number of blocks that have been determined to have motion during block level motion detection. Thereafter, motion detector 710 calculates a ratio of the number of pixel blocks having motion and the total number of pixel blocks in the corresponding difference frame. Motion detector 710 then checks if the ratio is greater than a predetermined inter-field motion threshold percentage. If it is determined that the ratio is greater than the predetermined motion threshold, it is established that inter-field level motion is present. In an embodiment of the present invention, the predetermined inter-field motion threshold percentage is in the range 0.10-2.0%. The difference frames are transmitted to analyzer 712 and field order signal generator 714 for further processing only when it is determined that block level and inter-field level motion is present in the video sequence.

Further, analyzer 712 analyzes video for opposite polarity and identical polarity pixel blocks. Analyzer 712 calculates the opposite and identical polarity pixel blocks by analyzing overlapping regions between two difference frames such as difference frames 306a, 306b, 306c, and 306d. The overlapping regions are the areas of difference frames 306a, 306b and difference frames 306c, 306d in identical time instants that have either a positive polarity pixel region or a negative polarity pixel region in both difference frames 306a, 306b and difference frames 306c, 306d, respectively. Further, analyzer 712 determines the number of opposite polarity pixels which is the number of pixels that have opposite polarity (positive and negative) in the overlap regions. In an embodiment of the present invention, the number of identical and opposite polarity pixels is determined by determining the number of identical and opposite polarity pixel blocks in the overlapping regions.

Subsequently, analyzer 712 transmits the number of opposite and identical polarity pixel blocks to field order signal generator 714 for field order detection. Field order signal generator 714 performs various checks for determining the field order of the video sequence. Field order signal generator 714 calculates the sum of the identical and opposite polarity pixel blocks. It then compares the sum with a first predetermined value to determine whether the sum is less than the first predetermined value. In an embodiment of the present invention, the first predetermined value is in a range from 5 to 20. If it is determined that the sum is less than the first predetermined value, field order signal generator 714 generates a field order signal indicating that the field order cannot be detected accurately due to lack of enough data. However, if field order signal generator 714 determines that the sum of the identical and opposite polarity blocks is greater than the first predetermined value, field order signal generator 714 performs a check to determine whether the number of opposite polarity pixel blocks is greater than the product of the number of identical polarity pixel blocks and a second predetermined value. In an embodiment of the present invention, the second predetermined value is in a range from 1 to 10. If field order signal generator 714 determines that the number of opposite polarity pixel blocks is greater than the product of the number of identical polarity pixel blocks and the second predetermined value, it generates a field order signal indicating that the field order is BFF.

However, if field order signal generator 714 determines that the number of opposite polarity pixel blocks is not greater than the product of the number of identical polarity pixel blocks and the second predetermined value, it performs a check to determine whether the number of identical polarity pixel blocks is greater than the product of opposite polarity pixel blocks and a third predetermined value. In an embodiment of the present invention, the third predetermined value is in a range from 0.7 to 5. If it is determined that the number of identical polarity pixel blocks is greater than the product of opposite polarity pixel blocks and the third predetermined value, field order signal generator 714 generates a field order signal indicating that the field order is top field first. However, if field order signal generator 714 determines that the number of identical polarity pixel blocks is not greater than the product of opposite polarity pixel blocks and the third predetermined value, a field order signal is generated indicating that accurate field order cannot be determined. Thereafter, the method for detecting field order is terminated.

Various components of the systems described above may be implemented in the form of software, a firmware, hardware or combinations thereof.

The systems, as described in the present invention or any of its components, may be embodied in the form of a computer system for detecting field order of a video sequence. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system includes a computer, an input device, and a display unit. The computer can incorporate a microprocessor. The microprocessor can be connected to a communication bus. The computer can also include a memory. The memory may include Random Access Memory (RAM) and/or Read Only Memory (ROM). The computer system can further incorporate a storage device. The storage device can include a hard disk drive or a removable storage drive, such as a floppy disk drive and/or an optical disk drive. The storage device can also be other similar means for loading computer programs or other instructions into the computer system.

The computer system executes a set of instructions that are stored in one or more storage elements in order to process input data. The storage elements may also hold data or other information as required. The storage element may be in the form of an information source or a physical memory element present in the processing machine.

The set of instructions may include various commands that instruct the processing machine to perform specific tasks such as the steps that constitute, the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine. The system and the components may include, by way of example, software or hardware and/or combinations of software and hardware.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A computer implemented method for detecting field order in a plurality of frames of a scene of one or more scenes, at least one frame of the plurality of frames having a plurality of pixels, the one or more scenes being portions of a video sequence, the method comprising:
   a. calculating a difference of a top field picture of a first frame of the plurality of frames and a bottom field picture of the first frame to determine a first difference frame, wherein the first difference frame is determined when a frame level motion in one or more objects of the first frame is detected in a second frame of the plurality of frames, wherein the second frame is the subsequent frame of the first frame;
   b. calculating a difference of the bottom field picture of the first frame and a top field picture of the second frame to determine a second difference frame, wherein the second difference frame is determined when the frame level motion in the one or more objects of the first frame is detected in the second frame, wherein the first and the second difference frames comprise one or more positive polarity pixels and one or more negative polarity pixels;
   c. dividing the first and the second difference frames into one or more pixel blocks, wherein at least one pixel block includes at least one of one or more positive polarity pixels and one or more negative polarity pixels;
   d. detecting a pixel block level motion and an inter-field level motion in the one or more objects of the first frame in the second frame, wherein the pixel block level motion is detected based on the number of positive and negative polarity pixels in a pixel block, and wherein the inter-field level motion is detected based on the number of pixel blocks having pixel block level motion;
   e. determining one or more opposite and identical polarity pixels of the plurality of pixels between the first difference frame and the second difference frame; and
   f. generating a field order signal based on the number of one or more opposite polarity pixels, the number of one or more identical polarity pixels, and detection of pixel block level motion and inter-field level motion.

2. The computer implemented method of claim 1 further comprising detecting a telecine process in the video sequence.

3. The computer implemented method of claim 2 further comprising applying an inverse telecine process on the video sequence if a telecine process is detected.

4. The computer implemented method of claim 1 further comprising detecting a change of scene in the one or more scenes.

5. The computer implemented method of claim 1, wherein detecting the motion further comprises detecting a motion of at least a pre-defined number of blocks in the first or second difference frame.

6. The computer implemented method of claim 1 further comprising comparing the number of one or more opposite polarity pixels with the number of one or more identical polarity pixels.

7. A system for detecting field order in a plurality of frames of a scene of one or more scenes, at least one frame of the plurality of frames having a plurality of pixels and the one or more scenes being a portion of a video sequence, the system comprising:
   a. a first difference frame calculator for calculating a first difference frame, wherein the first difference frame is the difference of a top field picture of a first frame and a bottom field picture of the first frame;
   b. a second difference frame calculator for calculating a second difference frame, wherein the second difference frame is the difference of the bottom field picture of the first frame and a top field picture of a second frame;
   c. a motion detector for detecting a motion in one or more objects of the first frame of the plurality of frames in a second frame of the plurality of frames, wherein the second frame is the subsequent frame of the first frame, and wherein the motion is detected using the first difference frame and the second difference frame;
   d. an analyzer for determining one or more opposite polarity pixels of the plurality of pixels between the first difference frame and the second difference frame and determining one or more identical polarity pixels of the plurality of pixels between the first difference frame and the second difference frame; and
   e. a field order signal generator for generating a field order signal based on the number of one or more opposite polarity pixels and the number of one or more identical polarity pixels.

8. The system of claim 7 further comprising a telecine pattern detector for detecting a telecine pattern in the video sequence.

9. The system of claim 7 further comprising an inverse telecine processor for applying an inverse telecine process on the video sequence.

10. The system of claim 7 further comprising a scene change detector for detecting a change of scene in the one or more scenes of the video sequence.

11. The system of claim 7, wherein the first and second difference frames comprise one or more positive polarity pixels and one or more negative polarity pixels, wherein the positive and negative polarity pixels are classified based on difference in contrasts of corresponding pixels belonging to a top field picture and a bottom field picture of the first and second frames, and wherein the motion detector divides the first and second difference frames into one or more pixel blocks.

12. The system of claim 7, wherein the motion detector detects a pixel block level motion and an inter-field level motion of at least a predefined number of pixels in the second frame with respect to the first frame, wherein the pixel block level motion is detected based on the number of positive and negative polarity pixels in a pixel block, and wherein the inter-field level motion is detected based on the number of pixel blocks having pixel block level motion.

13. The system of claim 7, wherein the analyzer further compares the number of one or more opposite polarity pixels with the number of one or more identical polarity pixels.

14. A storage element including a computer program product for detecting field order in a plurality of frames of a scene of one or more scenes, at least one frame of the plurality of frames having a plurality of pixels, the one or more scenes being a portion of a video sequence, the computer program product comprising a computer readable storage medium comprising:
   a. program instructions for calculating a difference of a top field picture of a first frame of the plurality of frames and a bottom field picture of the first frame to determine a first difference frame, wherein the first difference frame is determined when a frame level motion in one or more objects of the first frame is detected in a second frame of the plurality of frames, wherein the second frame is the subsequent frame of the first frame;
   b. program instructions for calculating a difference of the bottom field picture of the first frame and a top field picture of the second frame to determine a second difference frame, wherein the second difference frame is determined when the frame level motion in the one or more objects of the first frame is detected in the second frame, and wherein the first and the second difference frames comprise one or more positive polarity pixels and one or more negative polarity pixels;
   c. program instructions for dividing the first and the second difference frames into one or more pixel blocks, wherein at least one pixel block includes at least one of one or more positive polarity pixels and one or more negative polarity pixels;
   d. program instructions for detecting a pixel block level motion and an inter-field level motion in the one or more objects of the first frame in the second frame, wherein the pixel block level motion is detected based on the number of positive and negative polarity pixels in a pixel block, and wherein the inter-field level motion is detected based on the number of pixel blocks having pixel block level motion;
   e. program instructions for determining one or more opposite and identical polarity pixels of the plurality of pixels between the first difference frame and the second difference frame; and
   f. program instructions for generating a field order signal based on the number of one or more opposite polarity pixels, the number of one or more identical polarity pixels, and detection of pixel block level motion and inter-field level motion.

* * * * *